United States Patent [19]

Pierres

[11] 4,048,289
[45] Sept. 13, 1977

[54] STABILIZATION OF WET-PROCESS PHOSPHORIC ACID

[75] Inventor: Sergio Ortega Pierres, Mexico City, Mexico

[73] Assignee: Fertilizantes Fosfatados Mexicanos, S.A., Mexico City, Mexico

[21] Appl. No.: 630,492

[22] Filed: Nov. 10, 1975

Related U.S. Application Data

[63] Continuation of Ser. No. 424,578, Dec. 13, 1973, abandoned.

[51] Int. Cl.$^2$ .................. C01B 25/16; C01B 25/22; C05B 7/00
[52] U.S. Cl. .................. 423/317; 423/321 R
[58] Field of Search .................. 423/317, 370, 321

[56] References Cited

U.S. PATENT DOCUMENTS

| 2,799,557 | 7/1957 | Seyfried et al. | 423/320 |
| 2,987,376 | 6/1961 | Gloss | 423/321 |
| 3,141,734 | 7/1904 | Ditlinger | 423/321 |
| 3,151,941 | 10/1964 | Hollingsworth et al. | 423/321 |
| 3,505,013 | 4/1970 | Araki et al. | 423/320 |
| 3,512,927 | 5/1970 | Betts | 423/320 |
| 3,528,771 | 9/1970 | Shearon et al. | 423/320 |

FOREIGN PATENT DOCUMENTS

| 617,322 | 7/1961 | Canada | 423/321 |
| 1,023,345 | 8/1966 | United Kingdom | 423/321 |
| 1,240,285 | 4/1971 | United Kingdom | 423/321 |

Primary Examiner—O. R. Vertiz
Assistant Examiner—Eugene T. Wheelock
Attorney, Agent, or Firm—Larson, Taylor and Hinds

[57] ABSTRACT

Impure wet-process phosphoric acid is stabilized against sludge formation by adding to a solution of said acid about 0.1 to 1% by weight of an inorganic oxidizing agent and about 0.1 to 1% by weight of silica, aging the thus treated solution concentrated to a $P_2O_5$ content of 35% to 42% by weight for a time sufficient to form a solid phase and a substantially solid-free liquid phase of phosphoric acid improved in stability and separating the liquid and solid phases.

5 Claims, 1 Drawing Figure

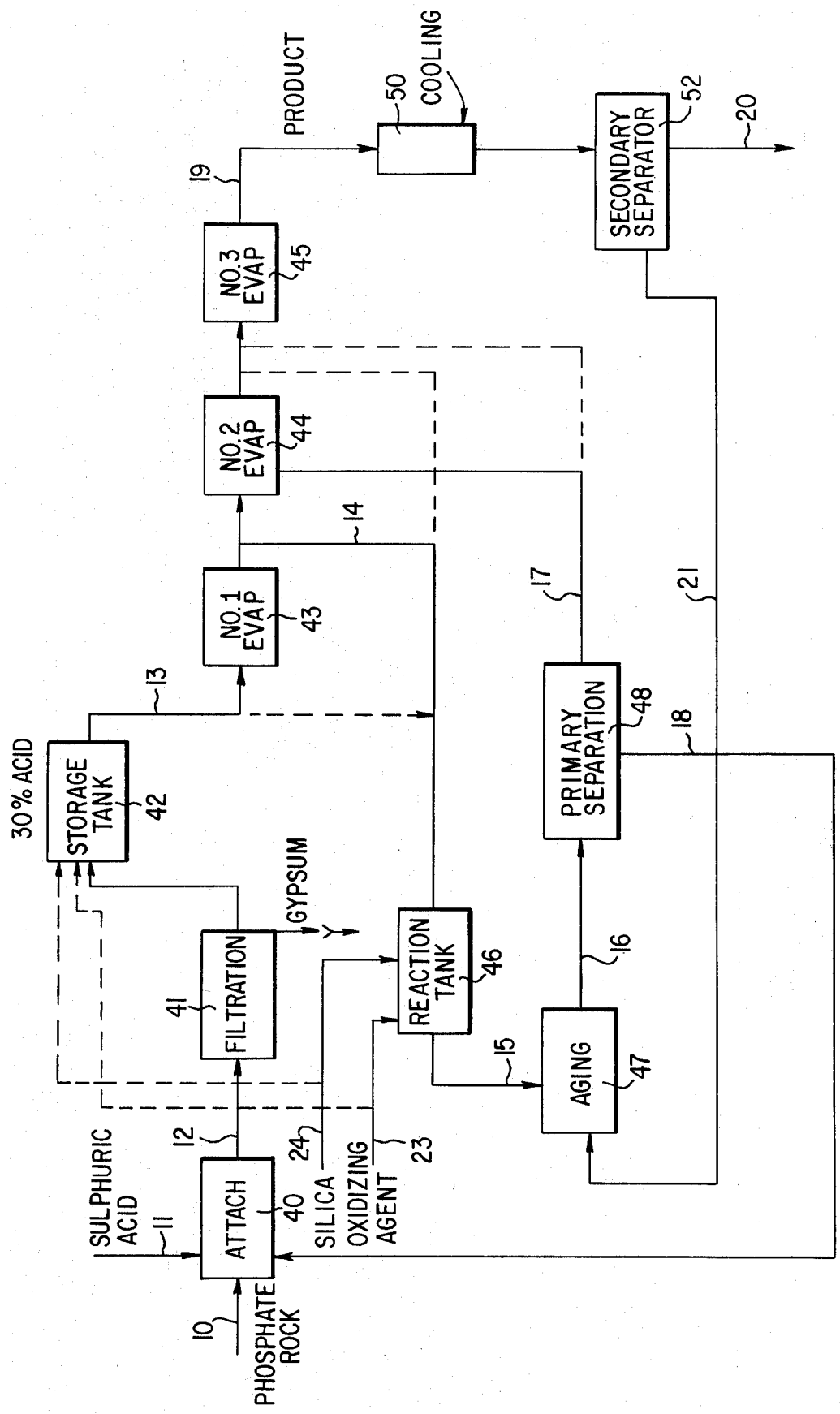

STABILIZATION OF WET-PROCESS PHOSPHORIC ACID

This is a continuation, of application Ser. No. 424,578 filed Dec. 13, 1973, now abandoned.

BACKGROUND OF THE INVENTION

This invention relates to a method for the preparation of commercial grade phosphoric acid having improved stability against sludge formation. More particularly, the present invention is directed to the stabilization of merchant grade phosphoric acid produced in accordance with the wet-process.

It is well known that ammonium phosphate fertilizer is mainly produced by the reaction of ammonia and phosphoric acid to produce ammonium phosphate. Ammonia for use in such reactions is readily available in comparatively pure form. However, phosphoric acid is available in several grades with varying degrees of purity. Because of the economics involved, wet-process grade phosphoric acid is ordinarily used in the production of fertilizer since wet-process acid is much less expensive that other grades.

Phosphoric acid is produced by the wet-process by acidulation of ground phosphate rock with sulphuric acid to produce a slurry composed of phosphoric acid, gypsum and impurities that are inherent in the phosphate rock. This slurry is filtered to eliminate a large part of the solid impurities leaving a filtrate of dilute phosphoric acid containing a small portion of solids as well as soluble impurities. The dilute phosphoric acid is then concentrated to commercial grade phosphoric acid usually a phosphoric acid containing a $P_2O_5$ content of 54% by weight.

During the digestion step of the wet-process, that is, the acidulation of the phosphate rock with sulphuric acid, some of the impurities in the phosphate rock such as, for example, iron, aluminum, silicon, fluorine, sodium and potassium are put into solution. When the filtrate is concentrated to commercial grade phosphoric acid, however, additional solids are formed. Moreover, after extended periods of time the wet-process phosphoric acid has a tendency to undergo solid formation and precipitation and form sludge consisting mainly of iron and aluminum phosphates. A primary contributor to this sludge formation has been found to be the potassium impurity present. The potassium promotes the post-precipitation which characterizes wet-process phosphoric acid by combining either with the iron and aluminum impurities to precipitate them as the metal phosphates or with the fluorosilicates to precipitate them as potassium silica fluoride. These two types of compounds are the main constituents of the solid or sludge that forms.

Needless to say, this sludge formation which occurs with commercial grade wet-process phosphoric acid results in a loss of appreciable quantity of phosphoric acid which is recoverable only by involved and costly processing. In addition, the sludge formation presents other difficulties in that it tends to eventually settle to the bottom of the storage vessels and clog the pipe lines and other equipment such as that used in the manufacture of phosphatic fertilizers.

It is an object of the present invention, therefore, to improve the stability of wet-process phosphoric acid against sludge formation during storage or after prolonged periods of time.

Yet another object of the invention is to provide a wet-process phosphoric acid of improved stability that is characterized by a reduced tendency to precipitate solids and at the same time by a reduced $P_2O_5$ content in the few solids precipitated.

BRIEF SUMMARY OF THE INVENTION

These and other objects of the invention which will be apparent to those skilled in the art are achieved by adding to impure wet-process phosphoric acid about 0.1 to 1% by weight of an inorganic oxidizing agent and about 0.1 to 1% by weight of activated silica, aging the thus treated solution concentrated to a $P_2O_5$ content of 35% to 42% by weight for a time sufficient to form a solid phase and a substantially solid-free liquid phase of phosphoric acid and separating the liquid and solid phases.

The separated phosphoric acid solution may then be further concentrated to a commercial grade $P_2O_5$ content, usually at least 50%, for example 54% by weight.

It has been found that when an oxidizing agent is added to the concentrated phosphoric acid solution the redox potential of the solution is changed and so is the solubility of potassium-iron phosphate, one of the insoluble compounds that ordinarily precipitates from wet-process phosphoric acid upon storage. Consequently, the addition of the oxidizing agent in the method of the present invention maintains more iron in solution. It can be said, therefore, that the oxidizing agent addition to wet-process phosphoric acid in accordance with the present invention can be considered as a "post-precipitation" controlling factor providing certain $SiO_2/F$ and $H_2SiF_6/k$ and/or sodium ratios which prevent this "post-precipitation". These ratios ordinarily fall within the following limit: 0.1–0.4 and 4.0–7.0 when the acid is aged.

The aging of the solution after treatment is effected to cause additional calcium sulphate precipitation as well as the precipitation of other inert materials. It has been found that effecting this aging while the $P_2O_5$ concentration of the phosphoric acid is in the range of about 35% to 42% allows very little if any iron and aluminum to precipitate from the solution. The optimum $P_2O_5$ content of the acid solution during aging is about 35% to 38% by weight.

The advantages offered by the method of the present invention can be seen by a comparison of the potassium content in merchant grade phosphoric acid with the phosphoric acid stabilized in accordance with the method of the present invention. The potassium content in merchant grade phosphoric acid is about 0.06% whereas the potassium content of phosphoric acid stabilized according to the present invention is about 0.02%. This means that about 80% less iron aluminum phosphate solids form when the phosphoric acid is stabilized in accordance with the method of the invention.

In addition, the method of the present invention acts to tie up more fluorine with silica as silica fluoride. Consequently, less aluminum fluoride complexes are able to precipitate out of solution. It is estimated that the reduction of solids formation corresponding to these compounds effected by the method of the present invention is about 80%.

Also, the total iron and aluminum (I and A) to $P_2O_5$ ratio in normal merchant grade phosphoric at 54% $P_2O_5$ strength is 0.053 at the solubility limit for iron and aluminum. According to the method of the present invention the solubility limit expressed at I and $A/P_2O_5$ ratio is about 0.065, which means a considerable increase in iron or aluminum solubility.

Another advantage provided by the present invention is the reduction of the $P_2O_5$ concentration found in any solids that do precipitate. For example, in conventional wet-process acid clarification systems using Florida rock or its equivalent (2.5% I and A), 40% of the $P_2O_5$ fed to the system is reported as sludge with appreciable amount of phosphoric acid which is recoverable only by utilizing it as feed to solid phosphate products. This, of course, requires additional facilities with high investment. Clarification of wetprocess phosphoric acid in accordance with the method of the present invention results in only 5% of $P_2O_5$ fed to the system as sludge and 95% will come out merchant grade phosphoric acid with 1.5 to 2.0% suspended solids maxium.

The oxidizing agents employed in the present invention may be any of the well known inorganic oxidizing compounds of the art. Illustrative of such compounds are $HNO_3$, $Na_2CrO_4$, $K_2Cr_2O_7$, $KMnO_7$ and the like or mixtures thereof. The preferred oxidizing agent is nitric acid.

The silica added along with the oxidizing agents of the present invention can be any siliceous material which possesses the inherent characteristic of being finely divided silica that is able to react with fluorine contained in wetprocess phosphoric acid. The preferred silica is diatomaceous earth. Activated silicas may also be used. In general the activation of silica is achieved by acid treatment as for instance with sulfuric acid or phosphoric acid at elevated temperatures followed by washing and drying. Ordinarily the activated silicas have exposed surface areas.

The addition of the chemical reagents of the present invention i.e. the oxidizing agent and activated silica to the wet-process phosphoric acid solution can be effected in any convenient manner. The only criteria is that sufficient hold up time be permitted in order to ensure reaction of the oxidizing agent and the activated silica. Ordinarily about 25 to 40 hours is adequate to complete the chemical reaction occurring. The reaction can be effected at ambient temperatures but it is preferred to add the phosphoric acid solution while at a temperature of 150° to 190° F.

Likewise the aging of the treated solution can be effected in any convenient manner using, for instance, aging tanks. The only criteria for the aging process is that prior to the aging the $P_2O_5$ content of the phosphoric acid solution be in the range of about 35% to 42% and sufficient aging time be allowed to complete precipitation of gypsum and other materials such as sodium and potassium silica fluoride. This time will vary by factors such as the type of phosphate rock employed to produce the acid but will generally fall within the range of about 25 to 50 hours.

DETAILED DESCRIPTION

There follows a detailed description of a preferred embodiment of the invention together with an accompanying drawing. However, it is to be understood that the detailed description and accompanying drawing are provided solely for the purpose of illustrating a preferred embodiment and that the invention is capable of numerous modifications and variations apparent to those skilled in the art without departing from the spirit and scope of the invention.

The drawing is a diagrammatic flow sheet of the clarification and stabilization method of the present invention.

Referring to the drawing, phosphate rock is directed by line 10 into a series of tanks referred to generally hereinafter as an attack system 40. Sulfuric acid is introduced into the attack system via line 11 to digest the phosphate rock and provide a slurry comprising phosphoric acid having a $P_2O_5$ strength of about 28% to 32%, preferably about 30% and calcium sulphates which crystallize out in the form of $CaSO_4.2H_2O$ (gypsum).

The phosphate rock introduced to the attack system is typically ground to a size of 60% minus 200 mesh, and has a $P_2O_5$ content of from about 30% to 33% by weight. In general, the sulphuric acid employed is of a concentration of about 40% to 65% by weight.

The attack system in which the phosphate rock is digested with the sulphuric acid consists of a certain number of tanks (not shown) provided with suitable agitation. The ground phosphate rock is fed to the first tank where it is wetted and dispersed. This compartment also receives dilute sulphuric acid and a portion of recycled slurry of phosphoric acid and calcium sulphate. The phosphate rock is chemically reacted when it flows into one or more tanks provided for this purpose. The thus formed slurry then flows serially from one tank to the next to allow completion of the reaction and produce a chemically stable and conditioned slurry before further processing.

The slurry comprising weak phosphoric acid and gypsum crystal is withdrawn from the attack system 10 and directed via line 12 to a filtration 41 wherein the liquid fraction is separated from the solid fraction. The gypsum solid fraction comprised essentially of gypsum is washed with water or other dilute phosphoric acid and then discarded.

The crude phosphoric acid solution from filtration 41 generally has a $P_2O_5$ content of from 28% to 32% by weight preferably about 30% by weight. This crude phosphoric acid solution is then passed to storage or holding tank 42. No such crude phosphoric acid solutions are saturated with calcium sulphate and contain essentially all the iron and aluminum present in phosphate rock as iron and aluminum phosphates.

From storage tank 42 the crude phosphoric acid is passed via line 13 to the number 1 evaporator 43 wherein the acid solution is concentrated to 35% to 42% $P_2O_5$ and then transferred by line 14 to reaction tank 46 which is provided with agitation means (not shown). An oxidizing agent such as nitric acid is introduced into reaction tank 46 by line 23 and a silica such as diatomaceous earth is added to the reaction tank 46 through line 24. Each of the oxidizing agent and silica are added in concentrations of 0.1% to 1% by weight. While this treatment is preferred to be conducted in a reaction tank 46 it also can be conducted in storage tank 42 if desired. Sufficient hold up time is provided in the reaction tank 46 in order to achieve a reaction of the oxidizing agent and activated silica. This acidic solution is then transferred to an aging tank 47 also provided with mild agitation wherein the solution is cooled and aged. The acidic acid solution introduced into reaction tank 46 can be solely number 1 evaporator product or a mixture of number 1 evaporator product and number 2 evaporator product such that the $P_2O_5$ strength of the acid solution will fall between the range of 35 to 42% $P_2O_5$.

The cooling and aging carried out in reactor 47 precipitates additional calcium sulphate as well as other inert materials. At the defined $P_2O_5$ concentration of about 35% to 42% almost no iron and aluminum precipitate and therefore only a very small amount of $P_2O_5$ is concentrated in the solid phase that results. Preferably the $P_2O_5$ concentration during the aging is about 35% to 38% by weight and the temperature of the acidic solution about 160° to 180° F.

The acidic solution is retained in the aging tank 47 for a time sufficient to allow the gypsum crystal to precipitate and grow as well as to complete reaction with chemicals added to promote sodium and potassium silica fluoride formation. The time required for precipitation of these compounds will vary by factors such as the type of phosphate rock used to produce the acid which will fall as aforementioned within the range of about 25 to 50 hours.

Upon completion of the aging the aged acid solution is then centrifuged or clarified in a primary gravity settler separator 48. The clarified acid is then transferred by line 17 to number 2 evaporator 44 and from there flows to a number 3 evaporator where it is finely concentrated to 54% $P_2O_5$. The solids content in this acid at this stage is still 1 to 2%.

The solid fraction from the separation effected in gravity settler separator 48 contains about 20 to 25% solids impurities is recycled back to attack system 40.

The 54% $P_2O_5$ content acid solution emerging from evaporator number 3 is directed by line 19 to a cooling operation 50 and is then subjected to a second centrifugation or clarification in a secondary gravity settler separator 52. The clarified product 20 from the separation is sent to storage with less than 1% solids and the solid phase from the separation containing about 4 to 6% solids impurities is recycled back to the aging tank 47.

The following Table I shows the difference in percent solids in acid treated according to the present invention as compared to an acid obtained by conventional clarification. Except for the treating steps in accordance with the present invention the processes employed were otherwise identical.

TABLE I

Percent solids in final product 54% $P_2O_5$ after 480 hours storage at 27° C.

| % P2O5 When Aging | Blank* | Acid Treated with Oxidizing Agent Only | Acid Treated with Oxidating Agent and Diatomaceous Earth |
|---|---|---|---|
| 35 | 2.20 | 0.61 | — |
| 42 | 3.40 | 1.78 | 1.42 |
| 45 | 3.51 | 1.32 | 1.37 |
| 54 | 3.85 | 1.96 | 0.73 |

*Acid obtained by conventional clarification process.

The data from the above Table I clearly demonstrates the surprising ability provided the commercial phosphoric acid by the method of the present invention. In addition, the data also demonstrates the importance of including diatomaceous earth in the treatment particularly at $P_2O_5$ concentrations of 54% by weight.

The following Table II summarizes data obtained from runs employing the above described general method of the present invention utilizing the indicated $P_2O_5$ contents when aging the acid in aging tank 47.

Table II

ACID PROCESSED ACCORDING TO THE PRESENT INVENTION

% Solids in the phosphoric acid after it has been aged at certain P2O5 strength (Only oxidating agent was added).

| % P2O5 When Aging | 15 Hrs. | 35 Hrs. | 45 Hrs. |
|---|---|---|---|
| 35 | 0.85 | 2.40 | 2.79 |
| 42 | 2.12 | 3.98 | 4.21 |
| 45 | 2.83 | 4.05 | 4.28 |
| 54 | 5.37 | 8.63 | 9.05 |

Percent solids and P2O5 content in solid fraction.

| % P2O5 When Aging | % Solids | % P2O5 in solid fraction |
|---|---|---|
| 35 | 2.79 | 6.75 |
| 42 | 4.21 | 8.56 |
| 45 | 4.28 | 9.50 |
| 54 | 9.05 | 19.50 |

% Solids in the 54% P2O5 final product were as follows: (solely nitric was added).

| % P2O5 Strength | Storage time (Hrs) at room temp. | | | |
|---|---|---|---|---|
| | 120 | 240 | 360 | 480 |
| 35 | 0.40 | 0.65 | 0.60 | 0.61 |
| 42 | 0.30 | 0.95 | 1.22 | 1.78 |
| 45 | 0.20 | 0.75 | 1.15 | 1.32 |
| 54 | 1.40 | 1.53 | 1.63 | 1.96 |

The data clearly demonstrates the advantages of utilizing a 35% to 42% by weight $P_2O_5$ content when conducting the aging step of the invention.

Table III below includes data obtained from runs utilizing the conventional clarification process, that is, a process run identical to that upon which the runs of Table II above were based except for the treatment with the oxidizing agent ($HNO_3$) and diatomaceous earth.

TABLE III

ACID PROCESSED ACCORDING WITH CONVENTIONAL CLARIFICATION PROCESS

Percent solids on phosphoric acid solution after it has been aged at certain P2O5 strength. No reagent & addition.

| % P2O5 When Aging | 15 Hrs. | 35 Hrs. | 45 Hrs. |
|---|---|---|---|
| | | % Solids. | |
| 35 | 2.05 | 2.98 | 3.52 |
| 42 | 2.16 | 3.89 | 5.17 |
| 45 | 2.22 | 3.75 | 5.25 |
| 54 | 5.46 | 8.54 | 11.25 |

Percent solids and P2O5 content in solid fraction

| % P2O5 When Aging | % Solids | % P2O5 in solid fraction |
|---|---|---|
| 35 | 3.52 | 7.60 |
| 42 | 5.17 | 9.50 |
| 45 | 5.25 | 11.13 |
| 54 | 11.25 | 27.55 |

% Solids in final product 54% P2O5 after centrifugation step.

| % P2O5 When Aging | Storaging Time (hrs) 27° C. | | | |
|---|---|---|---|---|
| | 120 | 240 | 360 | 450 |
| 35 | 1.0 | 1.45 | 1.75 | 2.20 |
| 42 | 0.96 | 1.98 | 2.85 | 3.40 |
| 45 | 1.04 | 2.05 | 2.95 | 3.51 |
| 54 | 1.10 | 2.18 | 3.03 | 3.85 |

A comparison of Table II and Table III shows not only the improved stability in the acid prepared by the method of the present invention but also the reduction in $P_2O_5$ content found in the solid fraction formed.

It is claimed:

1. A method for the preparation of merchant grade phosphoric acid stabilized against sludge formation which comprises concentrating a wet process phosphoric acid solution having a $P_2O_5$ content of about 28% to 32% by weight and containing in said solution Fe, Al, Si, F, and Na and K impurities to a $P_2O_5$ content of about 35% to 42% by weight; adding to the concentrated acid solution in a reaction tank, about 0.1 to 1.0% by weight of inorganic oxidizing agent to change the redox potential of the solution to increase the solubility of said Fe and Al impurities and to maintain same in said acid solution, adding to said concentrated acid solution in said reaction tank about 0.1 to 1.0% of activated silica; aging the thus treated solution for a time sufficient for said silica to react with said F impurities in said concentrated acid solution and cause formation of a solid phase precipitate and a liquid phase of stabilized phosphoric acid containing substantial amounts of said Fe and Al impurities; separating the liquid and solid phases by a first centrifugation; concentrating the separated liquid phase from the first centrifugation to a $P_2O_5$ content of at least 50% by weight; separating the solids formed in the concentrated liquid phase by a second centrifugation to obtain a clarified product solution having less than 1% solids; and recycling the solids from the second centrifugation to said reaction tank.

2. The method of claim 1 wherein the oxidizing agent is nitric acid.

3. The method of claim 1 wherein the reactive silica is finely divided diatomaceous earth.

4. The method of claim 1 wherein the phosphoric acid solution aged has a $P_2O_5$ content of 35% to 38% by weight.

5. The method of claim 1 wherein the separated liquid phase from the first centrifugation is concentrated to a $P_2O_5$ content of about 54% by weight.

* * * * *